United States Patent
Matsui et al.

(10) Patent No.: US 6,907,094 B2
(45) Date of Patent: Jun. 14, 2005

(54) DIVERSITY RECEIVING DEVICE

(75) Inventors: Masaki Matsui, Tokyo (JP); Shigeo Sato, Tokyo (JP); Toshiaki Fujikura, Tokyo (JP); Akio Horibe, Tokyo (JP); Muneki Ito, Tokyo (JP)

(73) Assignee: Uniden Corporation, Tokyo (JP)

( * ) Notice: Subject to any disclaimer, the term of this patent is extended or adjusted under 35 U.S.C. 154(b) by 639 days.

(21) Appl. No.: 10/095,028

(22) Filed: Mar. 12, 2002

(65) Prior Publication Data
US 2003/0026366 A1 Feb. 6, 2003

(30) Foreign Application Priority Data
Aug. 3, 2001 (JP) ........................................ 2001-236354

(51) Int. Cl.[7] .................................................. H04B 7/10
(52) U.S. Cl. ........................ 375/347; 375/267; 375/148; 375/144; 455/135; 455/277.2
(58) Field of Search ................................ 375/347, 267, 375/144, 147, 148; 455/132, 135, 277.1, 277.2

(56) References Cited

U.S. PATENT DOCUMENTS

| | | | | |
|---|---|---|---|---|
| 5,239,541 A | * | 8/1993 | Murai | 370/345 |
| 5,561,673 A | * | 10/1996 | Takai et al. | 714/708 |
| 5,634,204 A | * | 5/1997 | Takahashi et al. | 455/134 |
| 5,918,164 A | * | 6/1999 | Takahashi et al. | 455/134 |
| 5,940,454 A | * | 8/1999 | McNicol et al. | 375/347 |
| 6,385,181 B1 | * | 5/2002 | Tsutsui et al. | 370/335 |
| 2002/0072343 A1 | * | 6/2002 | Miyatani | 455/272 |

FOREIGN PATENT DOCUMENTS

JP  2000-295150  10/2000

* cited by examiner

Primary Examiner—Temesghen Ghebretinsae
(74) Attorney, Agent, or Firm—McDermott Will & Emery LLP

(57) ABSTRACT

The present invention provides a diversity receiving device with superior interference resistance in a simple construction, comprising a plurality of antennas (11, 12); an antenna switching device (13) that selects any one of a plurality of antennas (11, 12) and carries out connection switching thereof; a demodulator (14) that demodulates a wireless signal and obtains a baseband spread spectrum signal; an A/D converter (15) that A/D converts the baseband spread spectrum signal and generates chip data; a digital matched filter (16) that finds the correlation value of the chip data and the spreading code; a maximum correlation value detection portion (18) that detects the maximum correlation value; an average value calculation portion (21) that finds the average value per frame of the maximum correlation value; and a level comparison device (22) that compares the above-mentioned average value and a predetermined threshold value, and outputs a control signal to the antenna switching device (13) to control antenna switching in the antenna switching device (13).

3 Claims, 4 Drawing Sheets

PR : PREAMBLE
UW : UNIQUE WORD
DATA : DATA PORTION
AUX : AUXILIARY CODE FOR ERROR DETECTION
GT : GUARD TIME

DIVERSITY RECEIVING DEVICE

BACKGROUND OF THE INVENTION

1. Field of the Invention

The present invention relates to antenna switching diversity reception technology used in a direct sequence spread spectrum communication system.

2. Description of the Related Art

In wireless communication using digital portable telephones and automobile telephones and the like, due to the fading attributable to the movement of mobile communication terminals and to a multipath environment, the receive signal gives rise to a level fluctuation of several tens of dB and to phase fluctuation, and leads to an increase of encoding errors. For this reason, as technology to compensate for a drop in the reception level, the technology of post-wave detection switching diversity, antenna switching diversity, and the like, has been proposed. Post-wave detection diversity is a method that provides, inside receiving equipment, two or more systems, of antennas, and receivers that demodulate received radio waves and regenerate the received data, carries out data regeneration using each receiving system, and utilizes the data regenerated by the receiving system with the highest reception level. However, because post-wave detection switching diversity requires two or more receiving systems, there are the disadvantages that the construction of the receiving device becomes complex, and the manufacturing costs become high. For this reason, the system is not suitable for digital portable telephones which require a low cost and a simple construction.

Accordingly, antenna switching diversity has been proposed as technology to realize diversity at a low cost and with a simple construction. One example of antenna switching diversity receiving technology is explained with reference to FIG. 6. The diversity receiving device shown in this same figure is that which was disclosed in Japanese Patent Application Laid-open No. 2000-295150. In the same figure, reference numerals 27, 28 are antennas, 29 is an antenna switching device that switches the antennas, 30 is a receiving portion that receives and demodulates radio waves from a base station via antenna 27 or 28 and outputs the received data and has the capability to detect the strength of the receive signal. 31 is an antenna selection means that controls the antenna switching device 29 in response to the level of the receive signal detected by the receiving portion 30. The antenna selection means 31 comprises a low-pass filter 32 that filters the receive signal strength, a threshold generating means 33 that outputs the appropriate switching threshold with respect to the average receive signal strength, and a comparison means 34 that compares the switching threshold obtained from the threshold generating means 33 and the receive signal strength, and controls the antenna switching device 29 so as to switch the antennas when the receive signal strength has fallen below the switching threshold.

A low-pass filter 32 is used that has a cut-off frequency at the level of a Doppler shift frequency, which is produced in a received wave by a moving speed at a level equivalent to a walking speed. The switching threshold output by the threshold generating means 33 is set in response to the value of the receive signal strength filtered by the low-pass filter 32, and is set in a range of a prescribed upper limit value and lower limit value. By means of the above-mentioned construction, the switching threshold can be set in an appropriate range, even when the fading speed is slow, and a reduction in the benefits of diversity reception can be suppressed.

However, in the above-mentioned construction, there is the problem that the receive signal strength is judged to be high and antenna switching is carried out, even when the noise level contained in the receive signal is high, because it is not possible to judge the noise level of an interference wave, or the like, contained in a receive signal. This kind of problem becomes still more serious because mutual interference easily occurs in frequency bands, in which many communication systems are combined, such as in the ISM band (2.4 GHz band) used in the low power data communication system of a wireless LAN and the like. Furthermore, with antenna switching diversity, because excessive switching noise is generated at the time of switching the antenna connection in the antenna switching device, the deterioration of the signal-to-noise ratio (SNR), when antenna switching is carried out at the time of sending and receiving data, becomes a problem.

SUMMARY OF THE INVENTION

Accordingly, an object of the present invention is to resolve the above-mentioned problems and to offer a diversity receiving device that has excellent interference resistance with a simple construction. Furthermore, a further object of the present invention is to control the deterioration of the SNR accompanying antenna switching, by means of carrying out the timing of the antenna switching during the guard time.

The diversity receiving device of the present invention, that is intended to solve the above-mentioned problems, comprises a plurality of antennas for diversity receiving of radio waves, an antenna switching device that selects any one of a plurality of antennas and carries out connection switching thereof, a demodulation portion that demodulates the wireless signal obtained via the antenna connected by means of the antenna switching device and obtains a spread spectrum signal, a correlation value detection means that finds the correlation value of the above-mentioned spread spectrum signal and the spreading code, an average value calculation portion that finds the average value per frame of the maximum correlation value output by the correlation value detection means, and a level comparison device that compares the above-mentioned average value output by the average value calculation portion and a predetermined threshold value and outputs a control signal to the antenna switching device in order to control the antenna switching in the antenna switching device. By means of such a construction for the diversity receiving device of the present invention, because antenna switching is controlled based on the average value per frame of the maximum correlation value output by the correlation value detection means, antenna switching, that takes into consideration the signal-to-noise ratio, becomes possible and a diversity receiving device with superior interference resistance can be provided with a simple construction.

Furthermore, with the above-mentioned construction for the diversity receiving device of the present invention, the antenna switching device carries out the switching of the antenna during the guard time contained in a frame. By means of such a construction, a diversity receiving device, that can suppress the deterioration of the SNR that accompanies antenna switching, can be provided.

DESCRIPTION OF THE PREFERRED EMBODIMENTS

The present embodiment is explained below with reference to each figure.

Figure 1:
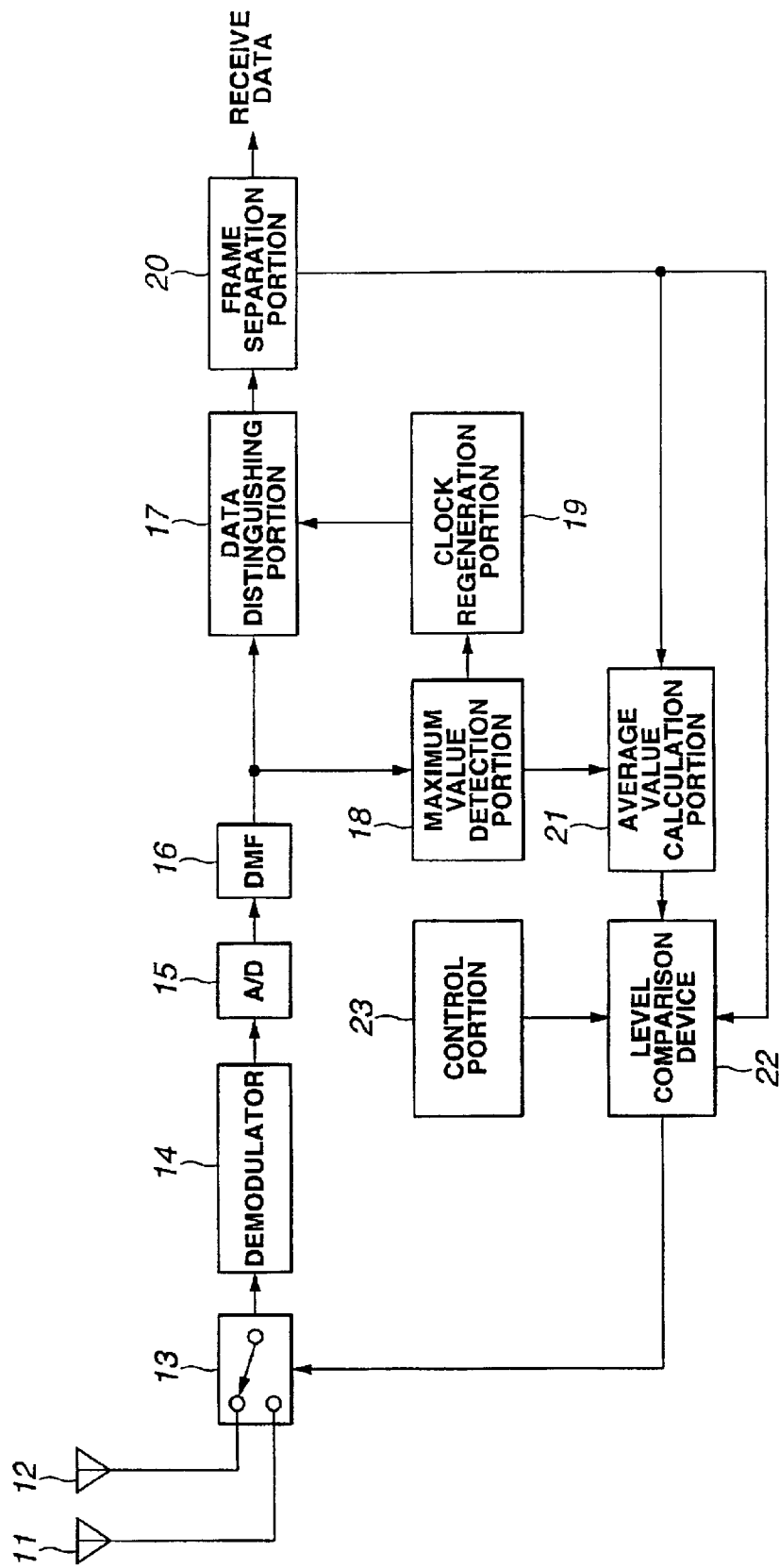
FIG. 1 is a block diagram of the diversity receiving device of the present invention.

FIG. 1 is a block diagram of the diversity receiving device of the present invention used in the direct sequence spread spectrum system of the TDD system. As shown in this figure, the diversity receiving device comprises an antenna 11, an antenna 12, an antenna switching device 13, a demodulator 14, an A/D converter 15, a digital matched filter (DMF) 16, a data distinguishing portion 17, a maximum correlation value detection portion 18, a clock regeneration portion 19, a frame separation portion 20, an average value calculation portion 21, a level comparison device 22, and a control portion 23.

In direct sequence spread spectrum communications, the data to be sent is multiplied by a spreading code and a baseband spread spectrum signal is generated. A transmitter sends a wireless signal that has modulated a carrier by this baseband spread spectrum signal (chip data). A radio wave sent from the transmitter arrives at the antennas 11, 12. The demodulator 14 demodulates a wireless signal received via an antenna selected by the antenna switching device 13, and obtains an analog baseband spread spectrum signal. The analog baseband spread spectrum signal is A/D converted by means of the A/D converter 15 and becomes a digitized baseband spread spectrum signal (chip data).

Figure 2:
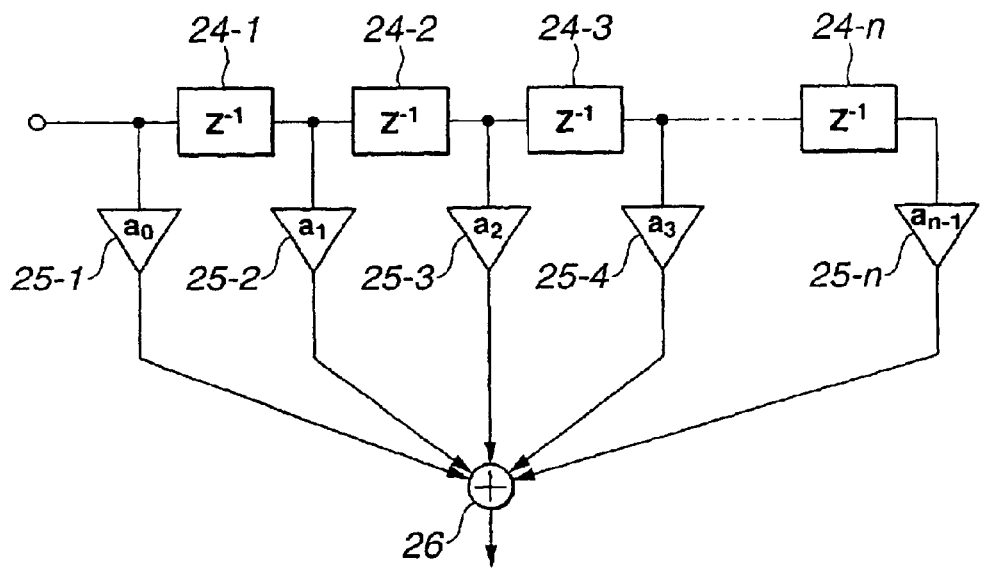
FIG. 2 is a block diagram of a digital matched filter.

A digital matched filter 16 finds the correlation value of the chip data output from the A/D converter 15 and the spreading code that has the same pattern as the sending side, and outputs the maximum correlation value at a frequency equivalent to the bit rate of the transmitted data. The digital matched filter 16, as shown in FIG. 2, is a digital filter composed of n delay elements 24-1, 24-2, . . . , 24-n, n multipliers 25-1, 25-2, . . . , 25-n, and an adder 26. The delay elements 24-1, 24-2, . . . , 24-n are composed of shift registers, or the like. A coefficient having a phase of the same pattern as the spreading code of the sending side is retained in each multiplier 25-1, 25-2, . . . , 25-n. When chip data is input in the delay elements 24-1, 24-2, . . . 24-n in order, the value in each chip interval of chip data and the coefficient stored in the multipliers 25-1, 25-2, . . . , 25-n corresponding to this value are multiplied, and the results thereof are all added by the adder 26 and the correlation value is output.

When each pattern in the chip interval of chip data and the pattern retained in the multiplier 25 match, the maximum correlation value is output from the digital matched filter 16. When the maximum correlation value detection portion 18 detects the maximum correlation value in a 1 bit interval of the received baseband spread spectrum signal, the detected pulse signal is output to the clock regeneration portion 19. The clock regeneration portion 19 regenerates the clock based on the detected pulse signal, and outputs same to the data distinguishing portion 17. The data distinguishing portion 17 carries out the regeneration of the transmitted data by distinguishing the output value of the digital matched filter 16 using the clock timing output by the clock regeneration portion 19. By means of the frame separation portion 20, the regenerated bit data is taken in as frame data and supplied to each of the subsequent circuits.

Figure 3:
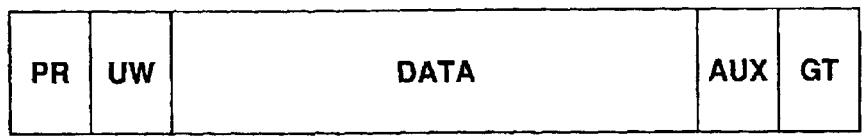
FIG. 3 is a format diagram of a receive frame.

FIG. 3 is an explanatory diagram of the format of a receive frame. A receive frame comprises a preamble (PR), a unique word (UW), a data portion (DATA), an auxiliary code for error detection (AUX), and a guard time (GT) and the like. For the base station to ensure stable communications within the frame cycle, even when there is a mobile station at the cell radius distance at which the propagation delay becomes the maximum, the guard time is set even longer than the time required for the propagation of a signal at a distance of twice the cell radius. The frame separation portion 20, outputs, for each frame, a frame timing signal, that corresponds to the guard time, to the average value calculation portion 21 and the level comparison device 22. The average value calculation portion 21 converts the level (peak level), of the maximum correlation value detected by the maximum correlation value detection portion 18, per frame, finds the average value of the peak level, and outputs this average value to the level comparison device 22. The level comparison device 22 compares the threshold value held in the control portion 23 and the average value of the peak level output from the average value calculation portion 22, and when the average value of the peak level is lower than the threshold value, outputs a control signal to the antenna switching device 13 in order to carry out the switching of the antennas based on the frame timing signal.

Figure 4:
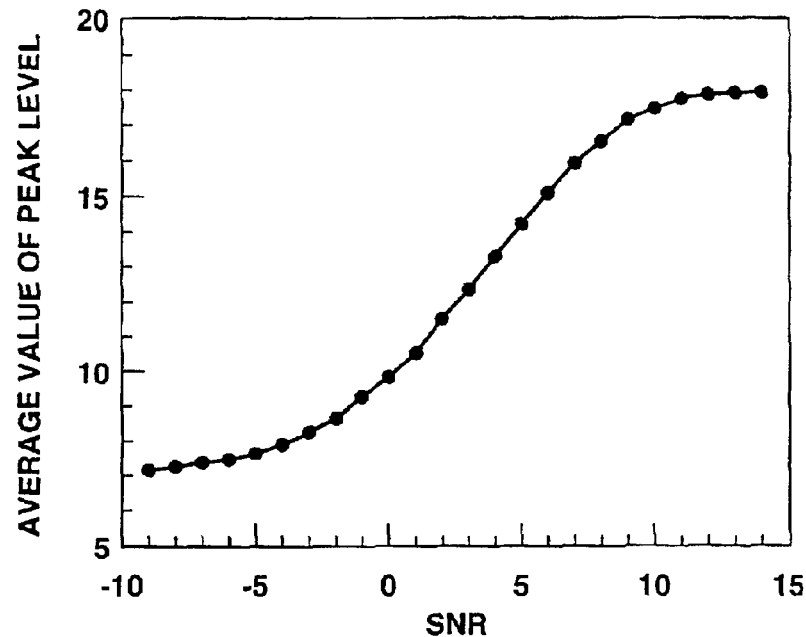
FIG. 4 is a graph of the average value of the peak level compared with the SNR.
Figure 5:
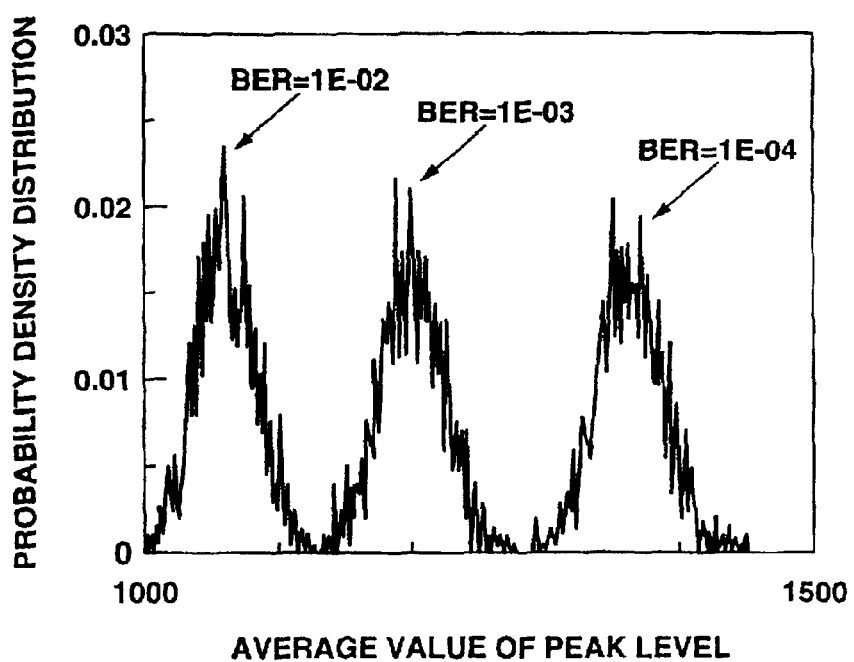
FIG. 5 is a graph of the probability density distribution compared with the average value of the peak level.
Figure 6:
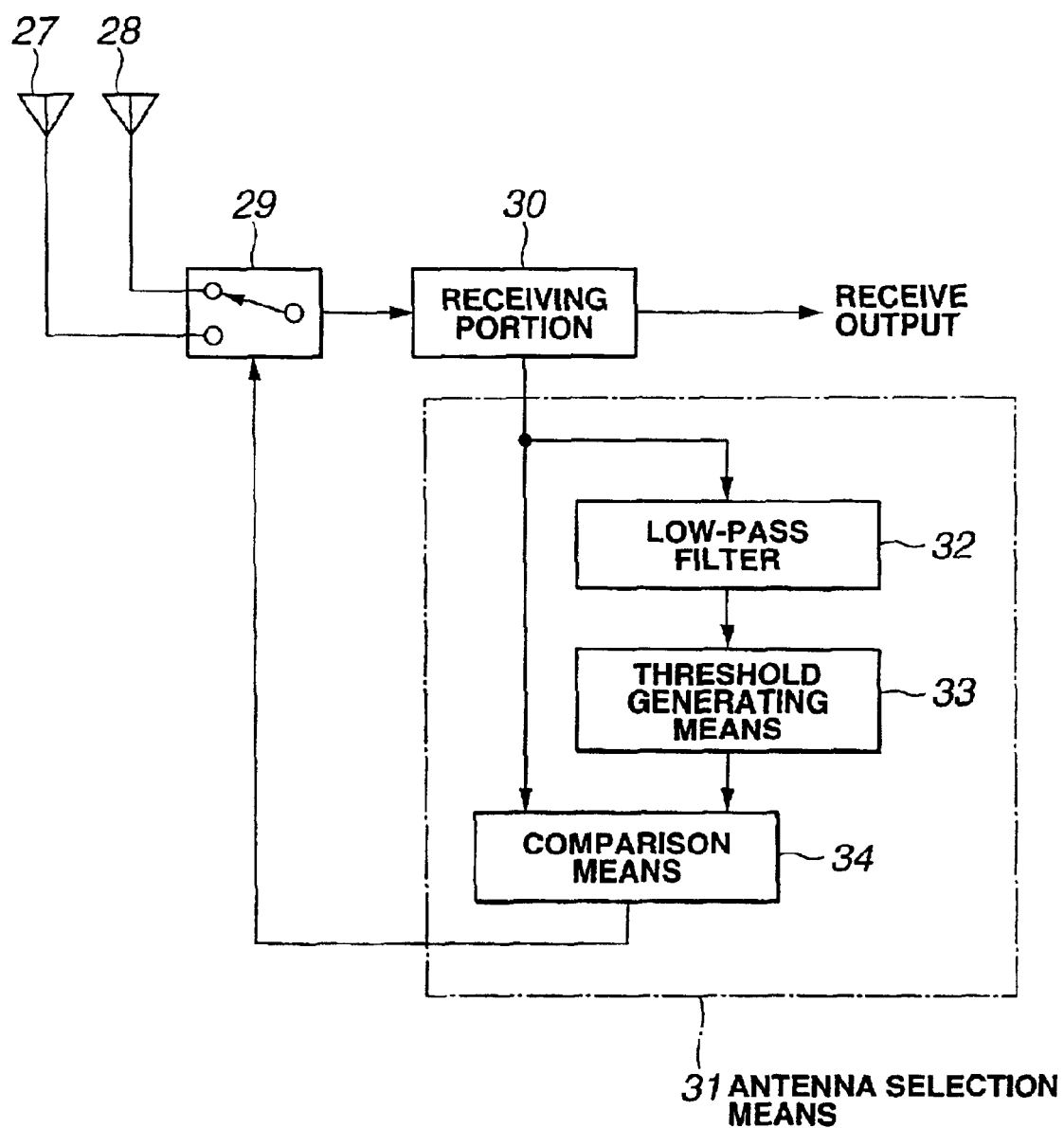
FIG. 6 is a block diagram of the diversity receiving device in the conventional technology.

FIG. 4 is a graph of the computer simulated result of the relationship between the average value per frame of the peak level detected by the maximum correlation value detection portion 18 and the SNR of the receive signal. As shown in the same figure, it is possible to obtain the SNR based on the average value of the peak level. Furthermore, FIG. 5 is a graph of the computer simulated result of the relationship between the average value of the peak level and the probability density. The bit error rate (BER) can be found using the SNR obtained from the average value of the peak level. In this way, with the present invention, since, instead of antenna switching being carried out based on the level of the receive signal, as in the conventional technology, antenna switching is carried out by estimating the SNR of the receive signal based on the average value per frame of the peak level output from the digital matched filter 16, an antenna switching diversity receiving device with extremely superior interference resistance can be realized.

Furthermore, in the diversity receiving device shown in FIG. 1, with the exception of the average value calculation portion 21, the level comparison device 22 and the threshold value setting portion 23, because the constitution is the same as the constitution included in a conventional spread spectrum communication device, an antenna switching diversity receiving device having superior interference resistance can be realized by a comparatively simple constitution. Furthermore, because the antenna switching device 13 carries out antenna switching in the timing of the guard time contained in the receive frame, the occurrence of antenna switching noise can be suppressed. Furthermore, the control portion 23 can select transmitting diversity and receiving diversity by setting whether antenna switching is carried out in the guard time of either the transmit frame or the receive frame.

According to the present invention, because antenna switching is controlled based on the average value per frame of the maximum correlation value output by the correlation value detection means, antenna switching, that takes into consideration the signal-to-noise ratio, becomes possible, and a diversity receiving device with superior interference resistance can be provided with a simple constitution. Furthermore, according to the present invention, because antenna switching is carried out within the guard time, a diversity receiving device, that can suppress the deterioration of the SNR accompanying antenna switching, can be provided.

What is claimed is:

1. A diversity receiving device, comprising:
   a plurality of antennas to diversity receive radio waves;
   an antenna switching device that selects any one of a plurality of antennas and carries out connection switching thereof;
   a demodulation portion that demodulates a wireless signal obtained via an antenna connected by means of the antenna switching device and thus obtains a spread spectrum signal;
   a correlation value detection means that finds the correlation value of said spread spectrum signal and a spreading code thereof;
   an average value calculation portion that finds the average value per frame of a maximum correlation value output by the correlation value detection means; and
   a level comparison device that compares said average value output by the average value calculation portion and a predetermined threshold value, and outputs a control signal to the antenna switching device in order to control antenna switching in the antenna switching device.

2. The diversity receiving device according to claim 1, wherein said antenna switching device switches antennas during a guard time contained in a frame.

3. The diversity receiving device according to claim 1 or claim 2, wherein said correlation value detection means is a digital matched filter.

* * * * *